United States Patent
Honda et al.

(10) Patent No.: US 10,755,704 B2
(45) Date of Patent: Aug. 25, 2020

(54) INFORMATION PROCESSING APPARATUS

(71) Applicant: SONY INTERACTIVE ENTERTAINMENT INC., Tokyo (JP)

(72) Inventors: Shinichi Honda, Saitama (JP); Hiroyuki Segawa, Kanagawa (JP); Shinichi Kariya, Chiba (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 30 days.

(21) Appl. No.: 15/771,720

(22) PCT Filed: Sep. 8, 2016

(86) PCT No.: PCT/JP2016/076440
§ 371 (c)(1),
(2) Date: Apr. 27, 2018

(87) PCT Pub. No.: WO2017/085992
PCT Pub. Date: May 26, 2017

(65) Prior Publication Data
US 2018/0350362 A1 Dec. 6, 2018

(30) Foreign Application Priority Data
Nov. 17, 2015 (JP) ................. 2015-225119

(51) Int. Cl.
*G10L 15/22* (2006.01)
*G10L 15/26* (2006.01)
(Continued)

(52) U.S. Cl.
CPC .............. *G10L 15/22* (2013.01); *G10L 15/26* (2013.01); *G10L 25/03* (2013.01); *G10L 25/48* (2013.01);
(Continued)

(58) Field of Classification Search
CPC ......... G10L 15/22; G10L 15/26; G10L 25/03; G10L 25/48; G10L 25/63; G10L 25/78
See application file for complete search history.

(56) References Cited

U.S. PATENT DOCUMENTS 9,082,407 B1 * 7/2015 Faaborg ................. G10L 15/22
2003/0216917 A1 11/2003 Sakunaga et al.
(Continued)

FOREIGN PATENT DOCUMENTS

JP 2001-228894 A 8/2001
JP 2001-331196 A 11/2001
(Continued)

OTHER PUBLICATIONS

International Search Report and Written Opinion dated Nov. 15, 2016, from the corresponding International Application No. PCT/JP2016/076440, 9 sheets.
(Continued)

*Primary Examiner* — Paras D Shah
(74) *Attorney, Agent, or Firm* — Katten Muchin Rosenman LLP

(57) ABSTRACT

An information processing apparatus identifies, by using an audio signal acquired by collecting a user's voice, evaluation target time that includes at least either time not including the user's voice or time during which the user is producing a meaningless utterance and produces an output appropriate to the identified evaluation target time.

9 Claims, 4 Drawing Sheets

(51) Int. Cl.
  *G10L 25/48* (2013.01)
  *G10L 25/78* (2013.01)
  *G10L 25/03* (2013.01)
  *G10L 25/63* (2013.01)
  *G10L 15/02* (2006.01)

(52) U.S. Cl.
  CPC .............. *G10L 25/63* (2013.01); *G10L 25/78* (2013.01); *G10L 2015/025* (2013.01); *G10L 2015/223* (2013.01)

(56) References Cited

U.S. PATENT DOCUMENTS

| | | | |
|---|---|---|---|
| 2008/0201135 A1* | 8/2008 | Yano | G10L 15/1822 704/201 |
| 2008/0235019 A1* | 9/2008 | Witzman | G10L 17/26 704/251 |
| 2009/0104592 A1* | 4/2009 | Miltenberger | G09B 7/00 434/362 |
| 2015/0206531 A1* | 7/2015 | Fujisawa | G10L 15/22 704/251 |
| 2017/0004829 A1* | 1/2017 | Kurisu | G06F 16/3329 |
| 2017/0125017 A1* | 5/2017 | Sugiyama | G10L 13/047 |

FOREIGN PATENT DOCUMENTS

| | | |
|---|---|---|
| JP | 2003-330490 A | 11/2003 |
| JP | 2005-196645 A | 7/2005 |
| JP | 2005-234331 A | 9/2005 |
| JP | 2006-202127 A | 8/2006 |

OTHER PUBLICATIONS

Kikuo Maekawa and Hiroki Mori, "Voice-quality Analysis of Japanese Filled Pauses: A Preliminary Report", Dept. Corpus Studies, National Institute for Japanese Language and Linguistics Graduate School of Engineering, Utsunomiya University, [online],[searched Nov. 16, 2015], Internet <URL:http://www2.ninjal.ac.jp/kikuo/Maekawa-DISS2015.pdf>, 4 sheets.

International Preliminary Report on Patentability dated May 22, 2018, from the corresponding International Application No. PCT/JP2016/076440, 14 sheets.

Notification of Reason for Refusal dated Apr. 16, 2019, from Japanese Patent Application No. 2017-551560, 5 sheets.

Yuya Chiba, A study on voice and face direction features for pre-speaking state estimation of a user, The Acoustical Society of Japan, 2011 Autumn Research Workshop Proceedings, Sep. 2011, 5 sheets.

* cited by examiner

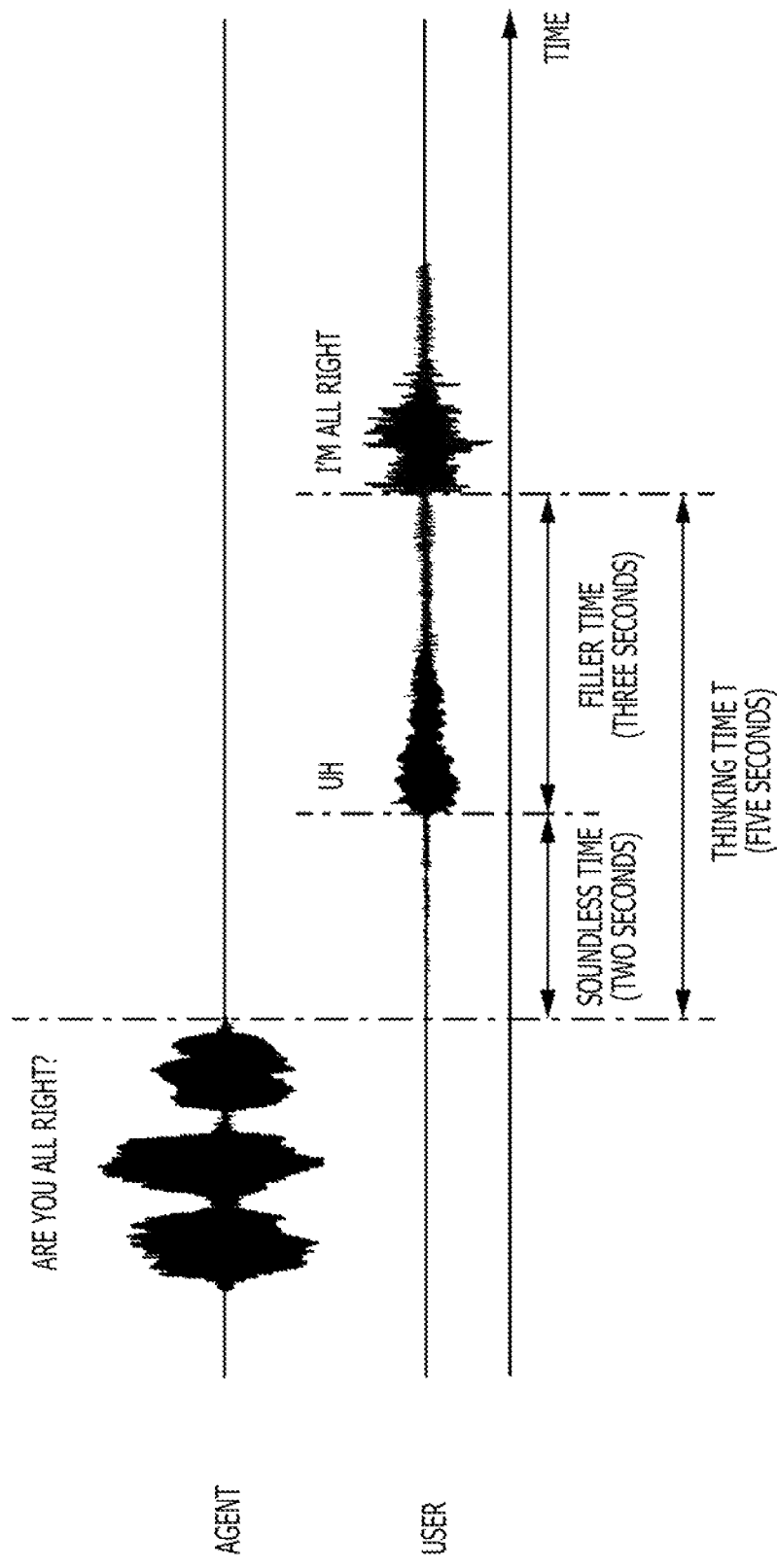

FIG.4

| QUESTION | "ARE YOU UNWILLING TO HAVE SOME TEA WITH ME?" |

| SELECTION CRITERIA | | POSSIBLE STATEMENT |
|---|---|---|
| ANTICIPATED ANSWER (NO) | HIGH EVALUATION VALUE | "I'M RELIEVED. LET'S GO RIGHT AWAY." |
| | MEDIUM EVALUATION VALUE | "REALLY? LET'S GO." |
| | LOW EVALUATION VALUE | "YOU ARE ACTUALLY UNWILLING TO GO, AREN'T YOU? I DON'T MIND." |
| UNANTICIPATED ANSWER (YES) | HIGH EVALUATION VALUE | "EEK. I'M MAD." |
| | MEDIUM EVALUATION VALUE | "EH? WHY?" |
| | LOW EVALUATION VALUE | "I KNOW YOU ACTUALLY WANT TO GO. WHY CAN'T YOU BE HONEST?" |

FIG.5

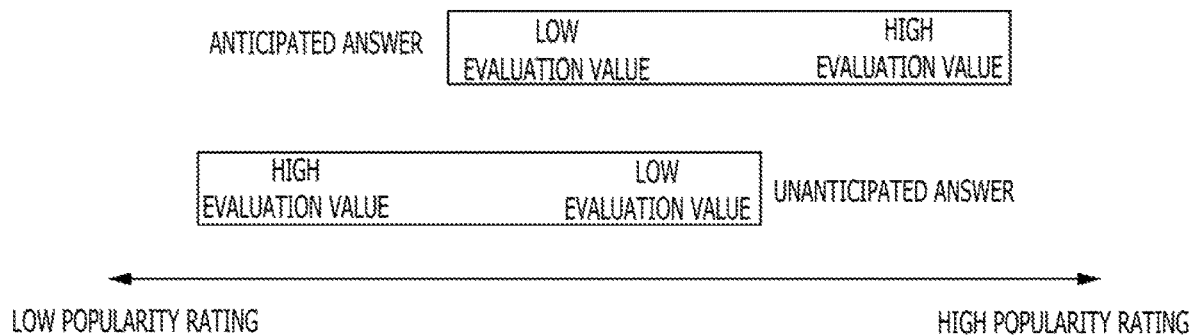

INFORMATION PROCESSING APPARATUS

TECHNICAL FIELD

The present invention relates to an information processing apparatus, an information processing method, a program, and an information storage medium that can accept audio input from a user.

BACKGROUND ART

There is known an information processing apparatus that accepts audio produced by a user and handles information processing in accordance with content of the audio. According to such a technology, it is possible for the user to input various instructions and information by speech instead of inputting characters from a keyboard or touch panel.

CITATION LIST

Non Patent Literature

[NPL 1]
Kikuo Maekawa and Hiroki Mori, "VOICE-QUALITY ANALYSIS OF JAPANESE FILLED PAUSES: A PRELIMINARY REPORT," [online], [searched Nov. 16, 2015], Internet <URL: http://www2.ninjal.ac.jp/kikuo/Maekawa-DISS2015.pdf>

SUMMARY

Technical Problem

In the above related technology, although it may be possible to accept simple instructions and character string information from a user, it is difficult to read the user's emotion and attitude. The user's emotion and attitude also manifest themselves in information other than content of speech (refer, for example, to NPL 1).

The present invention has been devised in light of the above circumstances, and it is an object of the present invention to provide an information processing apparatus, an information processing method, a program, and an information storage medium that permit reading of information other than content of the speech from user's speech.

Solution to Problem

An information processing apparatus according to the present invention includes an audio signal acquisition section, a time identification section, and an output section. The audio signal acquisition section acquires an audio signal acquired by collecting a user's voice. The time identification section identifies, by using the acquired audio signal, evaluation target time that includes at least either time not including the user's voice or time during which the user is producing a meaningless utterance. The output section produces an output appropriate to the identified evaluation target time.

An information processing method according to the present invention includes a step of acquiring an audio signal acquired by collecting a user's voice, a step of identifying, by using the acquired audio signal, evaluation target time that includes at least either time not including the user's voice or time during which the user is producing a meaningless utterance, and a step of producing an output appropriate to the identified evaluation target time.

A program according to the present invention is a program causing a computer to function as an audio signal acquisition section, a time identification section, and an output section. The audio signal acquisition section acquires an audio signal acquired by collecting a user's voice. The time identification section identifies, by using the acquired audio signal, evaluation target time that includes at least either time not including the user's voice or time during which the user is producing a meaningless utterance. The output section produces an output appropriate to the identified evaluation target time. This program may be provided stored in a computer-readable and non-temporary information storage medium.

BRIEF DESCRIPTION OF DRAWINGS

FIG. 3 is a diagram illustrating an example of thinking time identified by the information processing apparatus according to the embodiment of the present invention.

FIG. 4 is a diagram illustrating examples of possible agent statements and selection criteria thereof.

FIG. 5 is a diagram illustrating an example of a model that determines variation in popularity rating with the agent.

DESCRIPTION OF EMBODIMENT

A detailed description will be given below of an embodiment of the present invention based on drawings.

Figure 1:
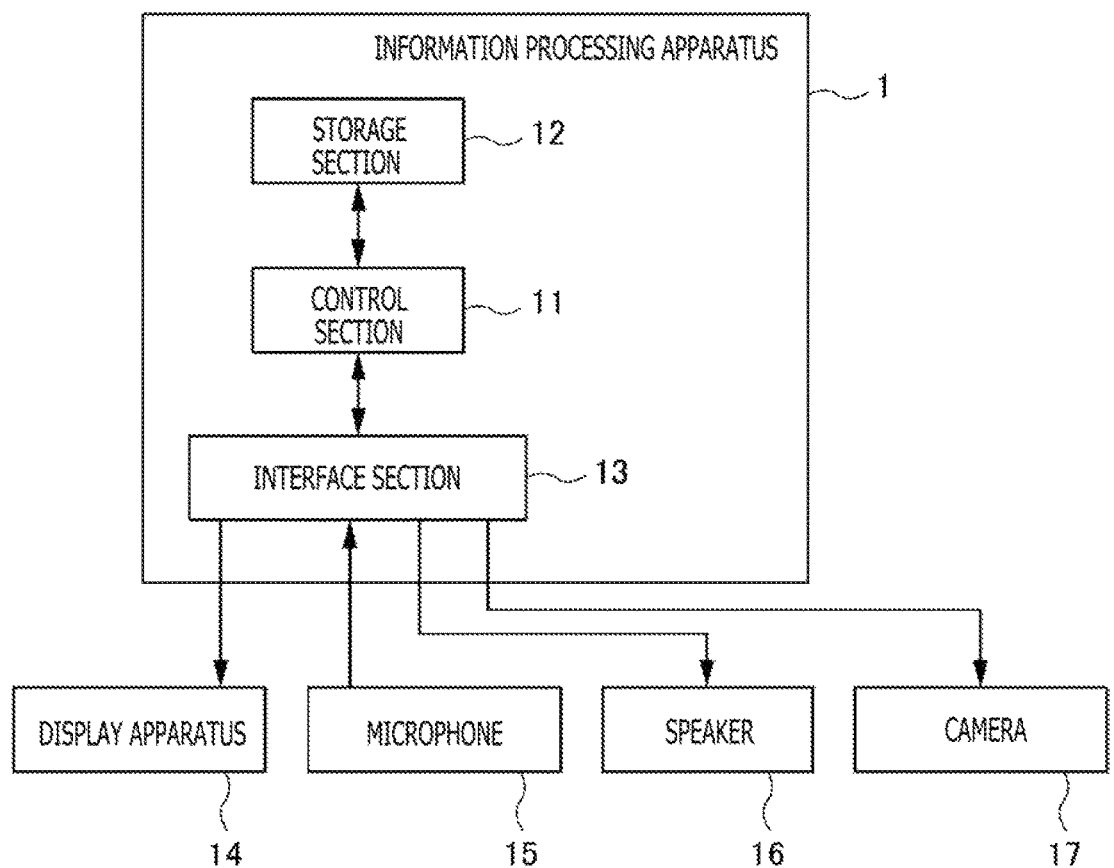
FIG. 1 is a configuration block diagram illustrating a configuration of an information processing apparatus according to an embodiment of the present invention.

FIG. 1 is a configuration block diagram illustrating a configuration of an information processing apparatus 1 according to an embodiment of the present invention. The information processing apparatus 1 is, for example, a home gaming console, a portable gaming console, a personal computer, or a smartphone and includes a control section 11, a storage section 12, and an interface section 13 as depicted in FIG. 1. Also, the information processing apparatus 1 is connected to a display apparatus 14, a microphone 15, a speaker 16, and a camera 17.

The control section 11 includes a central processing unit (CPU) and so on and carries out various information processing tasks by executing a program stored in the storage section 12. Specific examples of processes carried out by the control section 11 in the present embodiment will be descried later. The storage section 12 includes a memory device such as random access memory (RAM) and stores the program executed by the control section 11 and data processed by the program. The interface section 13 is an interface for the information processing apparatus 1 to exchange various pieces of information with the display apparatus 14, the microphone 15, the speaker 16, and the camera 17.

The display apparatus 14 is, for example, a home television receiver or liquid crystal display and displays an image appropriate to a video signal output from the information processing apparatus 1 on the screen. The microphone 15 outputs an audio signal, acquired by collecting a voice produced by the user of the information processing apparatus 1, to the information processing apparatus 1. The speaker 16 produces a sound in accordance with the audio signal output from the information processing apparatus 1. The camera 17 captures an image showing the appearance of the user and inputs the captured image to the information processing apparatus 1. It should be noted that the display apparatus 14, the microphone 15, and the speaker 16 may all be built into a housing of the information processing apparatus 1 or may be separate apparatuses connected to the information processing apparatus 1 in a wired or wireless manner. Also, the information processing apparatus 1 may be connected to a device having an attitude detection sensor such as triaxial acceleration sensor or geomagnetic sensor to detect a motion of the user's head. As the user puts on such a device, the user's head motion can be detected. Also, the information processing apparatus 1 may be connected to an operation input device (e.g., controller) that accepts user's operation input.

Figure 2:
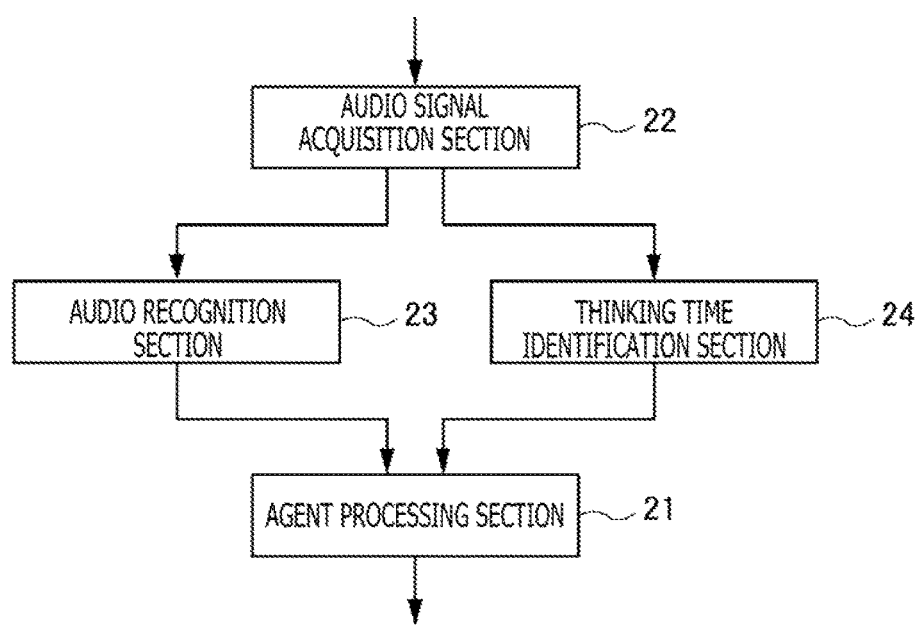
FIG. 2 is a configuration block diagram illustrating functions of the information processing apparatus according to the embodiment of the present invention.

A description will be given below of functions realized by the information processing apparatus 1 using FIG. 2. As illustrated in FIG. 2, the information processing apparatus 1 functionally includes an agent processing section 21, an audio signal acquisition section 22, an audio recognition section 23, and a thinking time identification section 24. These functions are realized as a result of the control section 11 operating in accordance with the program stored in the storage section 12. This program may be provided to the information processing apparatus 1 via a communication network such as the Internet or may be provided stored in a computer-readable information storage medium such as optical disc.

The agent processing section 21 realizes a virtual agent that communicates with the user and performs a conversational process with the user by the agent. Specifically, the agent processing section 21 accepts content of user's speech identified by the audio recognition section 23 which will be described later. Further, the agent processing section 21 determines content of an agent's statement in accordance with content of the user's speech accepted. Then, the agent processing section 21 generates an audio signal for uttering the determined content of the agent's statement and outputs the signal to the speaker 16. As a result, the agent's statement is played as audio from the speaker 16.

As a specific example, the agent processing section 21 determines a question to be posed to the user and plays the content thereof as audio. Then, the agent processing section 21 determines content of the agent's next statement based on the content of the user's response to the question. By repeating such a process, the agent processing section 21 can realize conversation with the user.

One feature of the present embodiment is that the agent processing section 21 uses evaluation target time identified by the thinking time identification section 24, described later when determining content of the agent's statement. In the description given below, evaluation target time identified by the thinking time identification section 24 will be denoted as thinking time T. The thinking time T is a time that matches a specific condition from playing of the agent's statement (question to the user here) and presentation thereof to the start of the user's response to the statement. It should be noted that although denoted as thinking time here for reasons of convenience, the thinking time T is not necessarily limited to time during which the user ponders over content of his or her response and may include time during which the user remains silent in hesitation to respond. A specific example of a process performed by the agent processing section 21 in accordance with the thinking time T will be described later.

Further, the agent processing section 21 may determine content of an agent's statement not only in accordance with content of user's speech and the thinking time T but also by using various pieces of information related to features of user's speech. Also, the agent processing section 21 may determine content of an agent's statement by using information related to the user's facial expression, action, and so on imaged by the camera 17. Such control allows the agent processing section 21 to realize, by taking into consideration not only content of the user's remark (linguistic information) but also various pieces of paralinguistic information such as user's emotion and thinking and non-linguistic information, conversion appropriate thereto.

Also, the agent processing section 21 may not only play an agent's statement as audio but also display an image representing the agent on a screen of the display apparatus 14. Further, the agent processing section 21 may display the movement of the character, for example, to match content of the user's speech, content of the agent's statement, and so on.

Also, the agent processing section 21 may hold a variety of parameters indicating agent's emotion, its psychological sense of distance toward the user, and a user's popularity rating, and so on. Contents of these parameters are updated successively based on content of user's speech. Then, the agent processing section 21 determines content of the agent's statement in accordance with the parameter values at that point in time. For example, when the user speaks or acts in a manner that angers the partner, the agent processing section 21 increases the parameter value that indicates the anger level of the agent and determines content of the statement in accordance with the parameter value. Such control enables presentation that makes it look as if the agent had emotions.

The audio signal acquisition section 22 acquires an audio signal collected by the microphone 15 and outputs the signal to the audio recognition section 23 and the thinking time identification section 24 which will be described later. In the present embodiment, the audio signal acquisition section 22 acquires the audio signal that includes a user's voice that responds to the content of the agent's statement.

The audio recognition section 23 identifies content of the user's speech by analyzing the audio signal acquired by the audio signal acquisition section 22. Such identification of speech content can be realized by various known voice recognition technologies such as statistical approach based on hidden Markov model and dynamic time warping method. The identified content of user's speech is used for a conversation process handled by the agent processing section 21.

The thinking time identification section 24 identifies the thinking time T based on the audio signal acquired by the audio signal acquisition section 22. As described earlier, the thinking time T is a time that matches a specific condition before the start of a user's response to an agent's statement. For example, the thinking time T may be an entire elapsed time period starting from the moment when the playback of an agent's statement ends (i.e., moment when the presentation of the agent's statement to the user is complete) and ending at the moment when the user begins to utter a response to the question. Also, the thinking time T may be part of this elapsed time period that matches the condition which will be described later.

A description will be given below of a specific example of the manner in which the thinking time T is identified by the thinking time identification section 24. The thinking time identification section 24 identifies at least either time not including the user's voice or time during which the user is producing a meaningless utterance in the audio signal as the thinking time T. In the description given below, time considered not including the user's voice in the audio signal will be referred to as a soundless time. Also, time during which the user is considered producing a meaningless utterance will be referred to as a filler time. The thinking time T may be only one of a soundless time and a filler time or a combined total of these two kinds of times. Also, as will be described later, a soundless time and a filler time may be individually identified separately.

For example, the thinking time identification section 24 decides that the time during which the magnitude of the audio included in the audio signal (amplitude of the audio signal) is equal to or less than a given threshold Th1 is a soundless time. When only the soundless time is treated as the thinking time T, the thinking time identification section 24 decides that the user has started to respond when the level of the audio signal acquired by the audio signal acquisition section 22 exceeds the given threshold Th1 for the first time after the end of the agent's statement and identifies the elapsed time until that moment as the thinking time T.

A filler time is a time period during which although producing a voice, the user is not making any linguistically meaningful statement. In general, when one speaks, one occasionally produces a voice that has in itself no meaning such as "Uh" and "Ah." Such an utterance is referred to as a pause filler or voiced pause. The thinking time identification section 24 can identify the duration until the user begins to make a substantially meaningful response with higher accuracy by including this filler time in the thinking time T.

As an example, the thinking time identification section 24 may consider the state in which the audio signal level remains at or below a threshold Th2 a filler time. The reason for this is that, normally, the voice is likely smaller while a pause filler is uttered than when a clearly meaningful statement is made. The threshold Th2 in this case is a larger value than the threshold Th1 for identifying the soundless time described earlier.

The thinking time identification section 24 may detect a filler time by using a frequency analysis result of the sound included in the audio signal. For example, the thinking time identification section 24 detects a filler time by using a result of a basic frequency estimation process (F0 estimation) performed on the audio signal. As an example, if F0 estimation fails, it is likely that the user is not making a clear statement. Therefore, that time period is considered a filler time. Also, if an F0 estimation result indicates a specific pattern different from an ordinal speech, that time period obtained by the pattern may be considered a filler time. Further, a filler time may be detected by using a combination of various analysis results such as audio signal level and audio recognition result rather than only an F0 estimation result.

Also, the thinking time identification section 24 may identify a filler time by using an estimator generated through supervised machine learning. In this case, audio signal data serving as a specimen is divided into a plurality of unit times, thereby generating, for each unit time, supervisor data having a label indicating whether or not the audio included in that time is a filler. It should be noted that each unit time may partially overlap other unit time. On the other hand, a feature quantity is calculated for the audio signal included in each unit time. The feature quantity of the audio signal in a unit time may be Mel-filter bank output, square root of the sum of signal amplitudes (power), and so on. Through machine learning that uses these pieces of data as inputs, it is possible to generate an estimator for deciding whether or not the audio signal corresponds to a filler.

Also, the thinking time identification section 24 may decide whether or not the audio signal corresponds to a filler by using a result of audio recognition process. Specifically, the thinking time identification section 24 identifies, as a filler time, a time period corresponding to an audio signal which the audio recognition section 23 failed in recognizing during audio recognition. It should be noted that the thinking time identification section 24 may identify, as filler times, all times corresponding to the audio signals that are considered not soundless times (including user's voice) and whose audio recognition failed. Alternatively, if a given kind of error occurs during the audio recognition process, the time period corresponding to the audio that developed that error may be identified as a filler time.

As a specific example, an audio recognition process using, for example, a hidden Markov model generates phoneme models from an audio database or a text database and generates word models from the phoneme models using, for example, a word dictionary in advance. In addition an audio recognition process generates language models from the text database. Also, during an actual audio recognition process, a feature quantity of the audio signal is calculated from acquired audio signal data, after which a decision is made as to which phoneme in the audio signal matches which phoneme model by using the calculated feature quantity and as to which word an audio made up of a plurality of consecutive phonemes matches. This is followed by matching with language models. Here, if matching with a phoneme model fails, or although it is decided that there is a match, but when the probability thereof is equal to or less than a given threshold, the thinking time identification section 24 identifies the time period during which that phoneme was uttered as a filler time. Also, if matching with a word model fails, the time period during which the set of phonemes subjected to the matching were uttered may be identified as a filler time. Also, when it is decided that there is a match with a specific word as a result of matching with a word model, the time period during which the set of matching phonemes were uttered may be identified as a filler time.

FIG. 3 is a diagram illustrating an example of the thinking time T identified by the thinking time identification section 24. Here, both soundless time and filler time are included in the thinking time T. In the example depicted in FIG. 3, the user remained silent for two seconds, uttered "Uh," a filler, for three seconds, and then began to respond to the question after the agent's question had been played. In this case, the thinking time identification section 24 identifies the thinking time T as five seconds. It should be noted that although a soundless time and a filler time are detected once each in this order, there is a possibility that a soundless time and a filler time may appear a plurality of times. Also, a soundless time and a filler time may appear in an opposite order. Also, in these cases, as long as the time period considered either a soundless time or a filler time lasts, the thinking time identification section 24 identifies the combined total of soundless time and filler time as the thinking time T.

A description will be given next of specific example of processes performed by the agent processing section 21 in accordance with the thinking time T identified by the thinking time identification section 24. Here, the agent processing section 21 changes the content of the agent's statement following the user's response to the agent's statement in accordance with the thinking time T the user took to respond. For example, even when the user makes an affirmative response to an agent's question but if the user took some time to respond to the question (if the thinking time T is long), there is a possibility that the response thereof may be passive and may not be based on a strong will of the user. Also, if the user responds immediately to a difficult-to-answer question (if the thinking time T is significantly short), it is probable that the response may be false and that the user may not be telling the truth. For this reason, the agent processing section 21 determines the content of the agent's next statement by reflecting such an estimation based on the thinking time T.

In this example, when outputting a question from the agent, the agent processing section 21 first determines a standard time that is probably necessary for the user to respond to the question. This standard time will be hereinafter referred to as a standard time Tr. The standard time Tr may be determined in advance in accordance with content of the question (topic or question format). For example, the agent processing section 21 sets the standard time Tr short when a question in a format easy to answer by the user is output such as type of question answered by "yes" or "no" and sets the standard time Tr long when a question in a format difficult to answer by the user is output.

The standard time Tr may be determined in accordance with the speech speed when an agent's question is played as audio. It is likely that, in general, when questioned in a quick tone, one attempts to respond right away and that when questioned in a slow tone, one ponders before responding. For this reason, when the audio of the question from the agent is played faster than a standard speed, the agent processing section 21 sets the standard time Tr shorter than the predetermined length in accordance with topic. Also, when the audio of the question from the agent is played slower than the standard speed, the agent processing section 21 sets the standard time Tr longer than the predetermined length. It should be noted that the agent processing section 21 determines the speech speed at which the agent's question is played in accordance with parameters indicating the agent's emotions or content of the question.

Next, when the user's response to the agent's question is acquired, the agent processing section 21 evaluates how much time the user took to respond by comparing the thinking time T identified by the thinking time identification section 24 with the standard time Tr. For example, the agent processing section 21 decides that the user responded in a standard amount of time when the difference between the thinking time T and the standard time Tr is equal to or less than a given threshold. On the other hand, if the difference exceeds the given threshold, the agent processing section 21 decides that the user responded immediately when the thinking time T is shorter the standard time Tr and decides that the user thought for a long time when the thinking time T is longer the standard time Tr. Alternatively, the agent processing section 21 may calculate the difference between the thinking time T and the standard time Tr as an index value indicating response speed and use the value for subsequent processes.

Here, the agent processing section 21 calculates a user response evaluation value in accordance with the result of comparison between the thinking time T and the standard time Tr as described above. This evaluation value is acquired by evaluating and quantifying the user's response according to a given standard. For example, the evaluation value may be a certainty factor indicating an estimation result of certainty of user's response. Also, the evaluation value may be a value acquired by quantifying various indices such as seriousness of user's response and strength of response. In the description given below, the evaluation value is a value acquired by quantifying a certainty factor as a specific example. For example, the longer the thinking time T is than the standard time Tr, the more likely it is that the user responded after debating. Therefore, the agent processing section 21 evaluates the certainty factor low. Also, when the thinking time T is extremely shorter than the standard time Tr, it is likely that the user responded without pondering. Therefore, the certainty factor may be evaluated low. It should be noted that the agent processing section 21 evaluates the certainty factor by combining various pieces of information such as sound volume level of the response, intonation, and user's facial expression and line of sight. For example, when the user's voice is quiet, the certainty level may be evaluated low, and when the user's voice is loud, the certainty level may be evaluated high. Also, the agent processing section 21 may calculate an evaluation value by using the absolute value of the thinking time T without using the standard time Tr. Here, the agent processing section 21 evaluates and grades the evaluation value (certainty factor) of the user's response into one of three levels, i.e., high, medium, and low.

On the other hand, the agent processing section 21 evaluates, based on the result of audio recognition performed by the audio recognition section 23, whether or not the user's response is what was anticipated as an answer to the question. For example, anticipated answers to the agent's question: "Do you like me?" are positive ones (affirmative answers) such as "Yes" and "I do." Anticipated answers to the question: "Are you unwilling to have some tea with me?" are negative ones (denying answers) such as "No" and "Not at all." What answers to use as anticipated answers are determined in accordance with kinds of questions. The agent processing section 21 analyzes content of the user's response acquired as a result of audio recognition and decides whether or not the response thereto matches a predetermined anticipated answer for each question.

The agent processing section 21 determines content of the agent's next statement based on these decision results. Specifically, the agent processing section 21 selects the content of the next statement from among a plurality of possible statements according to whether or not the content of the response is an anticipated answer and how high the evaluation value of the response thereto is. For example, the agent processing section 21 determines the content of the agent's statement from six possible statements in accordance with a combination of two options of whether the response is an anticipated answer or an unanticipated answer and one of three options of high, medium, and low as evaluation value grade. FIG. 4 illustrates examples of possible statements in this case. As the statement's content determined in this manner is output as an agent's statement, it is possible to change the agent's response in accordance with not only simply the user's response to the question but also the manner in which the user made the response (whether he or she responded seriously or passively). Therefore, it is possible to realize a conversation closer to human-to-human communication.

Although the certainty level of the user's response is evaluated using the thinking time T here, the agent processing section 21 may not only evaluate the level of the certainty factor but also use the thinking time T to evaluate the emotion or real intention included in the response, an example of which is deciding that the user's response is a lie if the thinking time T is extremely short. By using such an evaluation result, it is possible to cause the agent to make a unique statement tailored to the evaluation. As a specific example, the agent processing section 21 decides whether or not the user's response is a lie based on the thinking time T, change in the user's facial expression, and so on, further calculates, when it is decided that the response is not a lie, the certainty factor of the response as described earlier, and decides that the user is "serious" when the certainty factor is higher than a criterion and decides that the user is "not certain" when the certainty factor is lower than the criterion. Then, the agent processing section 21 determines the content of the agent's statement from among six possible statements based on two selection criteria, namely, whether the content of the user's response is an anticipated answer or an unanticipated answer and which of "serious," "not certain," and "a lie" the response is.

It should be noted that the certainty factor that has been described so far is evaluated separately from the content of the user's statement itself. That is, the agent processing section 21 can evaluate the certainty factor of the response irrespective of whether or not the user's response is an anticipated answer. Then, no matter what the content of the user's response, if the certainty factor is low, the content of the next statement may be determined without attaching importance to the response. Also, the agent may pose a question such as "Who are you?" for which it is impossible to prepare anticipated answers (e.g., not the kinds of questions that are answered by affirmation or denial). Also, in such a case, the agent processing section 21 can cause the agent to make a different response for the same answer in accordance with the certainty factor by evaluating the certainty factor of the response.

In the above description, the content of the agent's next statement was selected from among a plurality of possible statements in accordance with the thinking time T. However, an agent's subsequent behavior may be changed by other method using the thinking time T. Specifically, the agent processing section 21 may update a parameter indicating the agent's state in accordance with the thinking time T and the evaluation result of the certainty factor and determine the agent's subsequent statement and behavior in accordance with the updated parameter value.

As an example, the agent processing section 21 may increase or reduce the parameter of the user's popularity rating with the agent in accordance with whether or not the user's response is an anticipated answer and how high the certainty factor is and change the agent's subsequent statement in accordance with the result thereof. FIG. 5 illustrates a specific example of a model that determines variation in popularity rating in accordance with whether or not the user's response is an anticipated answer and how high the evaluation value of the response is. In the example depicted in FIG. 5, the popularity rating does not necessarily increase even if the user answers in the manner anticipated by the agent. That is, FIG. 5 depicts that the popularity rating is higher when the user gives an unanticipated answer with a high evaluation value than when the user gives an anticipated answer with a low evaluation value. Thus, by determining the variation in parameter in accordance with a combination of whether or not the user's response is an anticipated answer and the evaluation value, it is possible to update the parameter in accordance with not only simply whether or not the user gave an anticipated answer but also the manner in which the user made the response, thereby allowing the agent to make a more complicated and human-like response.

Here, when changing the popularity rating with the agent, the agent processing section 21 may cause the agent to speak and act to indicate the occurrence of the change. We assume, for example, that the popularity rating with the agent has declined as a result of an unanticipated answer made by the user to the agent's question when the popularity rating is high. At this time, if the popularity rating remains relatively high even after its decline, the agent maintains a friendly attitude toward the user, possibly resulting in the user not noticing the decline in popularity rating. For this reason, when the popularity rating declines, it is possible to make the user notice the impact of his or her speak and act on the agent, for example, by causing the agent to show a discontent facial expression only for a short time period.

Also, the agent processing section 21 may determine the parameter value at the current time based on a plurality of past responses rather than increasing or reducing the parameter value only by the amount determined simply in accordance with a single response. Specifically, each time a response is acquired from the user, the agent processing section 21 calculates an evaluation value of that response. Here, the evaluation value of the most recent response is denoted as Vr(1), and the evaluation value of the ith response from the current time backward into the past is denoted as Vr(i). This evaluation value may be, for example, a popularity rating value determined in accordance with the certainty factor of the response and the content of the response as described earlier. The agent processing section 21 calculates a current state value Vrc using n evaluation values from Vr(1) to Vr(n) acquired by n responses in the past. For example, the agent processing section 21 calculates Vrc by the following calculation formula:

$$Vrc = \sum_{i=1}^{n} w(i) Vr(i)/n \qquad [\text{Math. 1}]$$

where w(i) is the weight assigned to the evaluation value and calculated by the calculation following:

$$w(i) = e^{-\alpha(i-1)} \qquad [\text{Math. 2}]$$

where α is the positive constant close to 1 and smaller than 1. It should be noted that n may be a given constant or a value corresponding to the number of responses starting from the beginning of the process. According to such a calculation formula, it is possible to update the state value Vrc in consideration of the user's responses up to the current time while attaching importance to the relatively recent responses. The agent processing section 21 determines the agent's speak and act by using this updated state value Vrc. As a result, it is possible to cause the agent to speak and act in a manner that takes into consideration the user's responses in the past up to the current time, an example of which is speaking and acting in disgust to a repetition of ambiguous responses (responses with low certainty factor) made by the user.

It should be noted that the calculation formula of the state value Vrc is not limited to that described above. For example, the agent processing section 21 may calculate the current state value Vrc by the following calculation formula:

$$Vrc = \lambda Vrcp + (1-\lambda) Vr(1) \qquad [\text{Math. 3}]$$

where λ is the positive constant close to 0 and smaller than 1, and Vrcp is the state value calculated at the previous response.

Also, the agent processing section 21 can make various evaluations of the user by using the thinking time T in addition to the above. For example, when the thinking time T is long, it means that the user debated long before responding. Therefore, the user can be evaluated as not being confident about his or her statement or not being able to make up his or her mind. Conversely, when the thinking time T is short, the user can be evaluated, for example, as being enthusiastic to talk, positive, straightforward, honest, and so on. The agent's statement is changed in accordance with such an evaluation result, thereby allowing the agent to converse with the user with the user's condition factored in. Also, such an evaluation of the user may be managed as a parameter similar to the agent state described above, and the parameter value may be changed in accordance with the thinking time T.

Also, in the above description, the thinking time T was one of a soundless time, a filler time, and a combined total of a soundless time and a filler time, and the thinking time identification section 24 identified only one kind of the thinking time T for a response. However, the present invention is not limited thereto, and the thinking time identification section 24 may identify a soundless time and a filler time independently from each other. In this case, the agent processing section 21 may evaluate the user as described earlier by using the soundless time and the filler time separately. Also, the agent processing section 21 may change the content of the agent's statement by using the ratio between the soundless time and the filler time. For example, when the soundless time is higher in ratio than the filler time, the user can be evaluated as debating, being confused, and so on. Alternatively, one may evaluate that the communication is in an abnormal condition (in a condition different from a normal one). Also, when the filler time is higher in ratio than the soundless time, the user may be evaluated as being enthusiastic to talk, positive, not straightforward, not honest, and so on.

Also, when the response evaluation value and the parameter value at the time of updating are calculated in the above description, a relative value of the thinking time T may be used rather than an absolute value thereof. The relative value in this case is a value expressed by a difference from or a ratio to a normal value. The normal value is what represents the thinking time T of the user at a normal time and may be, for example, a typical value such as mean value or center value of the thinking time T acquired by a plurality of responses. Also, the normal value may be determined based on the user's speech speed. When the user has a high speech speed, the duration of conversation tends to be short. For this reason, it is possible to evaluate the thinking time T making the normal value to match user's speech speed by setting a normal value small for a user having a high mean speech speed and setting a normal value large for a user having a low mean speech speed.

Figure 6:
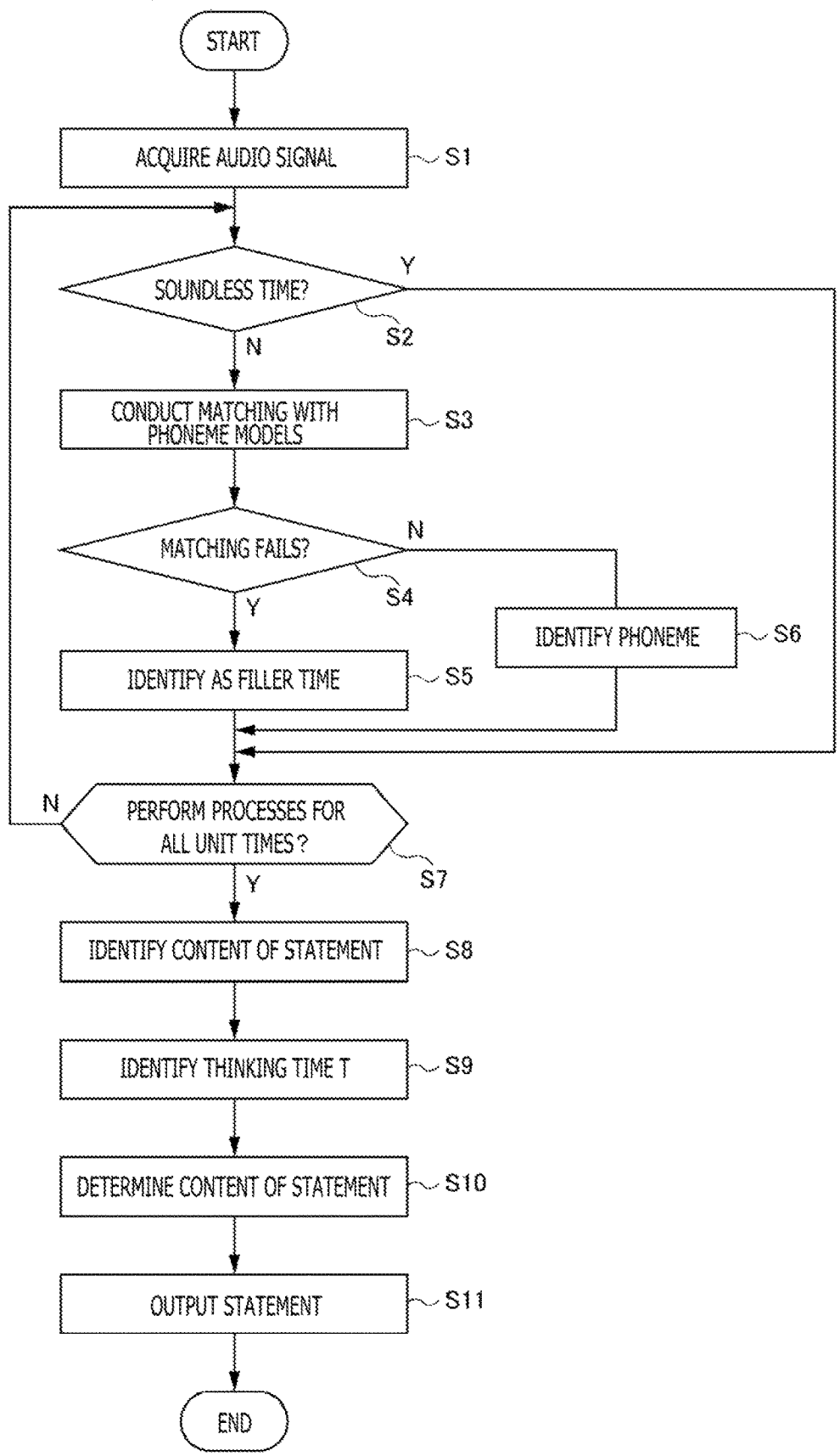
FIG. 6 is a flowchart illustrating an example of a processing flow performed by the information processing apparatus according to the embodiment of the present invention.

A description will be given here of an example of a processing flow performed by the information processing apparatus 1 after an agent's statement using the flowchart depicted in FIG. 6. It should be noted that we assume, in this flowchart, that if matching between an audio signal and a phoneme model fails, the time corresponding to the audio signal is identified as a filler time.

First, the audio signal acquisition section 22 acquires an audio signal collected by the microphone 15 after the agent's previous statement (S1). The audio recognition section 23 and the thinking time identification section 24 divide the audio signal into a plurality of unit times and perform processes described below on an audio signal included in each unit time. That is, the thinking time identification section 24 identifies a soundless time by deciding whether or not the user's voice is included in the audio signal that is included in the target unit time (S2). When the unit time is identified as a soundless time, control proceeds to S7.

When the unit time is identified as not a soundless time, the audio recognition section 23 conducts matching with phoneme models by calculating a feature quantity from the audio signal included in the target unit time (S3). Then, if matching fails, that is, if it is decided that there is no match between the audio signal and any one of the phoneme models, the thinking time identification section 24 identifies the target unit time as a filler time (S5). It should be noted, however, that when it is decided, as a result of a speech content identification process, described later, that the target unit time corresponds to a time after the user began to make a meaningful statement, the time in question is not considered a filler time. For this reason, the identification at this moment is temporary. On the other hand, when matching succeeds with a phoneme model, the audio recognition section 23 identifies the phoneme of the voice produced by the user during the target unit time in accordance with the matching result (S6).

Thereafter, when there are unit times yet to be processed, the processes from S2 to S6 described above will be repeated for the next unit time as a target (S7). When the processes described above end for all the unit times acquired by dividing the audio signal acquired in S1, control proceeds to the process in S8.

Next, the audio recognition section 23 identifies the content of the user's speech by conducting matching with word models and language models using the result of matching with phoneme models in S3 (S8). This is followed by identification of the thinking time T by the thinking time identification section 24 by using the soundless time identification result in S2 and the filler time identification result in S5 (S9). At this time, the time corresponding to the content of the user's speech identified in S8, i.e., the time after the user began to make a linguistically meaningful statement is excluded from the target for identifying the thinking time T. As a result, the time when matching fails with phoneme models after the user began to make a statement is not considered a filler time.

Thereafter, the agent processing section 21 determines an agent's next statement based on the thinking time T identified in S9 and the speech content in S8 (S10). Then, the agent processing section 21 generates an audio signal representing the determined content of the statement and outputs the signal (S11). It should be noted that although, in the flow depicted in FIG. 6, a soundless time and a filler time were identified for each unit time corresponding to one phoneme model by using an audio signal including the user's entire response as a target to be processed, the length of the audio signal to be processed by the information processing apparatus 1 and the time serving as a unit for identifying a soundless time and a filler time are not limited to those described above. For example, the information processing apparatus 1 may perform the processes as described above by using audio signals acquired until a given amount of time elapses. Also, when a word recognition process is performed by means of an audio recognition process, an audio signal subjected to the word recognition process may be used as a unit for deciding whether or not the audio signal corresponds to a filler time.

The information processing apparatus 1 according to the present embodiment allows for the agent to react in consideration of the certainty factor and emotions of the response not discernable from the content of the user's speech alone.

In the description given above, a description has been given of the processes for determining the content of an agent's statement by using the content of user's speech and the thinking time T. However, the agent processing section 21 may change not only the content of conversation but also the agent's appearance and behavior (e.g., facial expression and gesture) in accordance with the thinking time T.

Also, the agent processing section 21 may use various pieces of information in addition to the thinking time T to realize more natural conversation between the user and the agent. Paralanguage information that manifests itself in an audio signal recording user's conversation can be cited as an example of such pieces of information. Paralanguage information includes speech speed, sound volume (voice pressure), voice cadence, intonation (e.g., phrase stressed by the user), wording (e.g., polite tone or casual tone), amount of statements, and so on. Also, not only an audio signal acquired from the microphone 15 but also various pieces of information acquired from the user's image captured by the camera 17 may be used. User's facial expression, line of sight, blinking, and actions (gestures) such as nodding or waving can be cited as examples of pieces of information that can be acquired from an image. Such pieces of information are used in the same manner as with the thinking time T to evaluate how certain the user was about the response when he or she responded to the agent and decide the user's condition such as what kind of emotion he or she has.

Further, the agent processing section 21 may learn the user's action captured by the camera 17 and reflect the action into the agent's action displayed on the display apparatus 14. For example, it is possible to increase the user's affinity with the agent by imitating the user's characteristic action (habit) or making the agent move to match the user's action.

Also, the agent processing section 21 can not only cause the agent to simply converse but also to seem to the user more like a real human thanks to various actions performed by the agent. As a specific example, during user's speech, the agent processing section 21 causes the agent to perform actions of pointing its line of sight toward the user, nodding, and making a statement as a reply of approval, thereby making the agent look as if it were listening to the user's statement.

Also, when a sound of a specific pattern other than the user's voice is detected from the audio signal collected by the microphone 15, the agent processing section 21 may cause the agent to make a statement or action that suits the detected sound. For example, when an intercom or chime sound or a mobile phone incoming call sound is detected, the agent processing section 21 causes the agent to speak and act in reaction to the detected sound. Also, even if the user is not making any statement, the agent processing section 21 may cause the agent to voluntarily speak to the user or speak and act in such a manner as to attract the user's attention as long as the user's presence is detected by the image of the camera 17. Also, the agent may be caused to speak and act in a manner tailored to changing times and seasons by acquiring current time information. Such control ensures that the agent seems more like an existing human.

Also, although, in the above description, agent's statements were played as audio, the contents of agent's statements may be displayed on the display apparatus 14. Also, in this case, the soundless time or the filler time until the user begins to make a response to an agent's statement after the agent's statement is displayed may be identified as the thinking time T, and the agent's speak and act thereafter may be changed in accordance with the content thereof.

Also, although, in the above description, the content of the agent's statement was changed in accordance with the thinking time T, embodiments of present invention are not limited thereto. For example, the information processing apparatus 1 may present the parameter value itself of the popularity rating with the agent and so on described above to the user by displaying the value on the display. Also, the information processing apparatus 1 may change the progress of a game in accordance with the identified thinking time T or evaluate a user's statement and output its result rather than causing an agent to make statements. In this case, no agent is required to converse with the user. Also, in this case, the information processing apparatus 1 uses a given moment as a starting point for identifying the thinking time T rather than using the moment of an agent's statement and identifies the time from the given moment to when the user begins to make a meaningful speech as the thinking time T. The starting point in this case may be, for example, the end of other user's conversation when an audio signal including conversations of a plurality of users is recorded and the moment when the user issues an instruction.

Also, although, in the above description, the local information processing apparatus 1 provided immediately close to the user handles all processes including the determination of the agent's statement, the identification of the thinking time T, and the audio recognition, some or all of these processes may be handled by a server apparatus connected via a communication network. In particular, when the server apparatus handles the acquisition of an audio signal from a local terminal apparatus, the identification of the thinking time T using the acquired audio signal, and the production of an output appropriate to the identified thinking time T (e.g., transmission of a message including an agent's statement), this server apparatus functions as an information processing apparatus in the present invention.

REFERENCE SIGNS LIST

1 Information processing apparatus, 11 Control section, 12 Storage section, 13 Interface section, 14 Display apparatus, 15 Microphone, 16 Speaker, 17 Camera, 21 Agent processing section, 22 Audio signal acquisition section, 23 Audio recognition section, 24 Thinking time identification section.

The invention claimed is:

1. A conversation agent for conversing with a user, the conversation agent comprising:
an output device for outputting a question to a user;
an audio signal acquisition section adapted to acquire and analyze an audio signal from the user in response to the question;
a time identification section adapted to identify, within the audio signal, a total thinking time and a total response time; and
an agent processing section for:
determining if the audio signal contains an answer;
determining an answer classification for the answer as an anticipated answer or as an unanticipated answer; and
comparing a difference between a standard time and the total thinking time to a predetermined threshold to determine an evaluation value Vrc for the answer,
wherein the standard time is a predetermined necessary time for the user to respond to the question;
selecting an audio response-determined by the evaluation value Vrc and the answer classification; and
outputting the audio response using the output device,
wherein Vrc is calculated using n evaluation values from Vr(1) to Vr(n) acquired by n responses in the past according to a formula:

$$Vrc = \frac{\sum_{i=1}^{n} w(i) \cdot Vr(i)}{n}$$

where w(i) is the weight assigned to each past evaluation value and calculated according to:

$$w(i) = e^{-\alpha(i-1)}$$

where α is a positive constant.

2. The conversation agent of claim 1, wherein
the total filler time includes at least the time during which the user is producing a meaningless utterance, and
wherein the total thinking time further includes a time for which speech content recognition by the agent processing section failed.

3. The conversation agent of claim 1, further comprising:
a holding section adapted to hold a parameter value used to determine content of the output produced by agent processing section, wherein
the parameter value held by the holding section is updated in accordance with the total thinking time.

4. The conversation agent of claim 3, wherein
the agent processing section changes the audio response in accordance with the parameter value held by the holding section.

5. The conversation agent of claim 1, wherein
the agent processing section outputs a statement directed to the user ahead of identification of the determining if the audio signal contains an answer,
the time identification section identifies the total thinking time before the user responds to the statement, and
the agent processing section changes an output after the audio response in accordance with the total thinking time.

6. The conversation agent of claim 5, wherein
the output section outputs a statement selected from among a plurality of possible statements in accordance with an identified evaluation target time after the response.

7. The conversation agent of claim 6, wherein the agent processing section outputs the statement selected in accordance with a plurality of selection criteria including the total thinking time.

8. An information processing method for a conversation agent comprising:
outputting a question to a user from a speaker of the conversation agent;
acquiring and analyzing an audio signal from the user in response to the question;
identifying, within the audio signal, a total thinking time and a total response time,
determining if the audio signal contains an answer;
determining an answer classification for the answer as an anticipated answer or as an unanticipated answer; and
comparing a difference between a standard time and the total thinking time to a predetermined threshold determine an evaluation value Vrc for the answer,
wherein the standard time is a predetermined necessary time for the user to respond to the question;
selecting an audio response determined by the evaluation value Vrc and the answer classification; and
outputting the audio response using the output device,
wherein Vrc is calculated using n evaluation values from Vr(1) to Vr(n) acquired by n responses in the past according to a formula:

$$Vrc = \frac{\sum_{i=1}^{n} w(i) \cdot Vr(i)}{n}$$

where w(i) is the weight assigned to each past evaluation value and calculated according to:

$$w(i) = e^{-\alpha(i-1)}$$

where α is a positive constant.

9. A non-transitory computer-readable information storage medium storing a program for a computer, the program comprising:
outputting a question to a user from a speaker of the conversation agent;
acquiring and analyzing an audio signal from the user in response to the question;
identifying, within the audio signal, a total thinking time and a total response time,
determining if the audio signal contains an answer;
determining an answer classification for the answer as an anticipated answer or as an unanticipated answer; and
comparing a difference between a standard time and the total thinking time to a predetermined threshold determine an evaluation value Vrc for the answer,
wherein the standard time is a predetermined necessary time for the user to respond to the question;
selecting an audio response determined by the evaluation value Vrc and the answer classification; and
outputting the audio response using the output device,.
wherein Vrc is calculated using n evaluation values from Vr(1) to Vr(n) acquired by n responses in the past according to a formula:

$$Vrc = \frac{\sum_{i=1}^{n} w(i) \cdot Vr(i)}{n}$$

where w(i) is the weight assigned to each past evaluation value and calculated according to:

$$w(i) = e^{-\alpha(i-1)}$$

where α is a positive constant.

* * * * *